United States Patent [19]
Tokura et al.

[11] Patent Number: 5,445,555
[45] Date of Patent: Aug. 29, 1995

[54] RESIN MATERIAL RECLAIMED FROM OPTICAL RECORDING DISK AND METHOD OF RECLAIMING SAME

[75] Inventors: Kunihiko Tokura; Masaru Uryu, both of Tokyo, Japan

[73] Assignee: Sony Corporation, Tokyo, Japan

[21] Appl. No.: 98,263

[22] PCT Filed: Dec. 3, 1992

[86] PCT No.: PCT/JP92/01582
  § 371 Date: Aug. 5, 1993
  § 102(e) Date: Aug. 5, 1993

[87] PCT Pub. No.: WO93/11533
  PCT Pub. Date: Jun. 10, 1993

[30] Foreign Application Priority Data

Dec. 5, 1991 [JP] Japan ................. 3-321812
Oct. 22, 1992 [JP] Japan ................. 4-284558

[51] Int. Cl.⁶ ........................................ B24B 1/00
[52] U.S. Cl. .................................. 451/28; 451/63
[58] Field of Search ........... 451/28, 56, 63; 29/403, 29/426.4

[56] References Cited

U.S. PATENT DOCUMENTS

| | | | |
|---|---|---|---|
| 3,943,666 | 3/1976 | Dion et al. | 451/28 |
| 4,347,689 | 9/1982 | Hammond | 451/63 |
| 4,514,937 | 5/1985 | Gehrung et al. | 451/28 |
| 4,656,790 | 4/1987 | Mukai et al. | 451/28 |
| 4,964,242 | 10/1990 | Ruble et al. | 451/63 |
| 5,099,615 | 3/1992 | Rubble et al. | 451/63 |
| 5,099,618 | 3/1992 | Schmid | 451/63 |
| 5,199,143 | 4/1993 | Defazio | 451/63 |
| 5,220,754 | 6/1993 | Tayebi et al. | 51/281 |
| 5,307,593 | 5/1994 | Lucker et al. | 451/63 |

FOREIGN PATENT DOCUMENTS

| | | |
|---|---|---|
| 3511711 | 2/1986 | Germany . |
| 1-307019 | 12/1989 | Japan . |
| 2-9516 | 1/1990 | Japan . |
| 53-112979 | 10/1991 | Japan . |
| WO89/08676 | 9/1989 | WIPO . |

*Primary Examiner*—Maurina T. Rachuba
*Attorney, Agent, or Firm*—Hill, Steadman & Simpson

[57] ABSTRACT

A surface (1S), on which a recording layer of an optical recording disk (1) consisting of a resin material having the recording layer is provided, is polished by a polishing member (2), obtained by processing into a cylindrical shape a polishing sheet produced by mixing a supporting material with abrasive grains and an adhesive agent for hot-pressing, while supplying water thereto, to thereby take out a resin material. One of a reaction modifier, a compatible resin and a rubber component is added to the reclaimed resin material.

5 Claims, 4 Drawing Sheets

F I G. 2
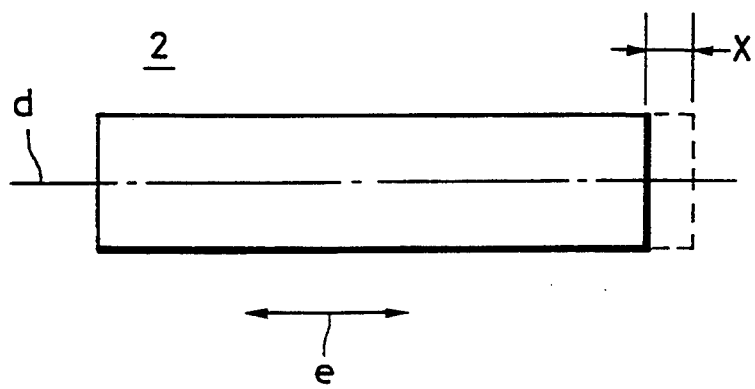
F I G. 3
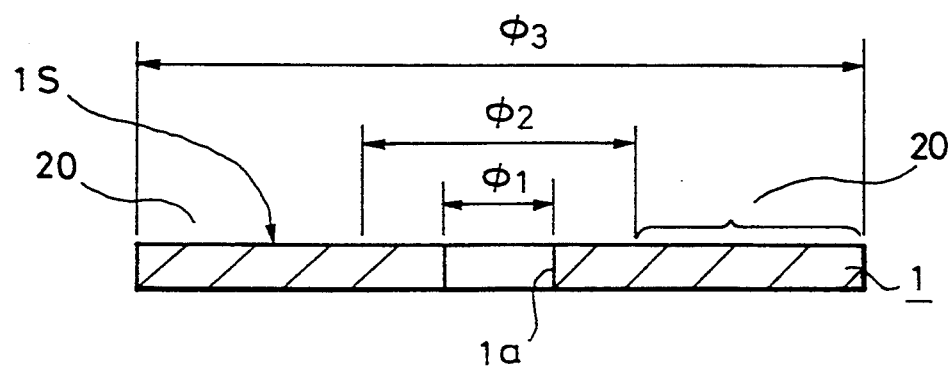

RESIN MATERIAL RECLAIMED FROM OPTICAL RECORDING DISK AND METHOD OF RECLAIMING SAME

TECHNICAL FIELD

This invention relates to a resin material reclaimed from an optical recording disk and a method of reclaiming the same in which a resin material that is a base plate material is reclaimed from waste disks such as an optical recording disk, i.e., so-called compact disk (CD) or the like.

BACKGROUND ART

At present, more than about ten million optical recording disks, i.e., so-called CDs are produced monthly in Japan and a large amount of about ten and several tons of waste disks are produced monthly in Japan even by a small fraction defective. A present waste disk processing method that is employed by the waste disk processing specialists is that these waste disks are crushed and then buried. These waste disks are not recycled substantially.

The reason for this is that the optical recording disk has a multi-layer structure which comprises a base plate, a reflecting film such as Al evaporated film for reflecting a reproducing laser light, a protecting film formed thereon and a label printing film. Therefore, it is not possible to take out only the resin material from the waste disk. Consequently, the usage that the waste disk is recycled as a reclaimed plastic, i.e., reclaimed synthetic resin material is limited considerably.

Recently, from an environmental problem standpoint, the recycling of resin material is regarded as an important problem and several experiments are made in order to recycle the aforesaid optical recording disk. Under the present condition, there have been examined several methods of removing the Al evaporated film, the protecting film and the label film from the resin material. However, to realize these methods, an alkaline releasing liquid of high temperature and high concentration is required and such alkaline liquid is too dangerous. Also, there is then the problem that a secondary environmental pollution concerning the foul solution processing will occur.

Further, it is frequently observed that the waste disk is crushed as it is and then repelleted together with an enforcement. In this case, a material such as the Al evaporated film, the protecting film, the label printing film or the like is mixed into the pellet thus produced so that, when such pellet is recycled for a variety of products, the molding condition is fluctuated. Further, physical characteristics such as flexural strength, flexural rigidity or the like of the molded product become unstable. There is then the problem that the usage of such molded product is limited.

An optical recording disk material is excellent in flowability and transparent characteristic and has less optical distortion and contamination.

Accordingly, a polymer of low molecular weight and which has a small molecular weight distribution is utilized. This material is polycarbonate (PC), acrylic resin and amorphous polyolefin and optical materials of some special grades are now commercially available on the market. These materials are low in shock resistance and poor in mechanical characteristic as compared with a general molded grade material.

The material reclaimed from these disks is subjected to thermal hysteresis and is therefore made lower in shock resistance. Thus, the above material cannot be applied to function parts substantially.

For this reason, almost all of these materials are buried excepting that a spool and a runner are utilized as an extending agent of recycled PC by the reclaiming specialist.

On the other hand, CD cases that are formed by utilizing an optical recording disk recycled material are already commercially available on the market (see Japanese laid-open patent publication No. 4-253677). These cases have such features that aluminum pieces in the recording layer are properly dispersed to increase a design characteristic. However, since the mixed amount (the recording layer, the protecting layer and the label layer) of impurity material cannot be controlled. There is then the risk that a physical characteristic thereof is fluctuated. Thus, a field in which such recycled material is applied to the function molded product also is narrow.

An object of the present invention is to take out easily a base material of optical recording disk without impurity materials such as an Al (aluminum) evaporated film or the like so that a resin material can be recycled efficiently.

Another object of the present invention is to obtain from an optical recording disk a reclaimed resin material which can provide shock resistance sufficient so that various cases such as an accommodating case, i.e., CD case, a cabinet or the like can protect an accommodated product when applied as a recycled molded product of the optical recording disk or which can provide a mechanical strength sufficient that it is requested to have as a general molded product.

DISCLOSURE OF INVENTION

The method of the present invention is a method of reclaiming a resin material from an optical recording disk. As shown in FIG. 1 that is a schematic diagram of an example of an apparatus for carrying out this method, an optical recording disk 1 made of a resin material having on one side thereof a recording layer is polished at its surface 1S in which the recording layer is formed by a polishing member 2. Polishing member 2 is formed by processing a polishing sheet in which abrasive grains and an adhesive agent are mixed and then pressed on a supporting member by a hot-pressing in a cylindrical shape. The resulting polishing member is used to remove the recording layer on the surface of the recording disc while supplying water thereto, to thereby take out a resin material.

Further, according to a method of reclaiming a resin material from an optical recording disk of the present invention, in the above-mentioned reclaiming method, a revolution rate of the polishing member 2 is selected to be less than 3000 r.p.m. and the grade of the polishing member 2 is selected to be more than #320.

A resin reclaimed from the optical recording disk, for example, a thermoplastic resin material such as polycarbonate (hereinafter referred to as PC), acrylic resign, amorphous polyolefin or the like taken out from the optical recording disk by the above-mentioned respective methods of the present invention or other methods is added with a reactive reforming agent, a compatible resin and a rubber component in order to improve a shock value.

More specifically, a reclaimed resin material is made by adding a reactive reforming agent such as acidic group, glycidyl group, anhydride group to a resin material taken out from the optical recording disk.

Further, the reactive reforming agent of 3 weight % or more is added to the resin material.

Furthermore, the reclaimed resin material of the present invention is made by adding the resin material taken out from the similar optical recording disk with a resin having a compatible property with this material and whose Izod shock value is larger than 20 kgfcm/cm ($\frac{1}{8}$-inch thick and having a notch).

In the specification of the present application, Izod shock values are values measured under the condition that the resin material has the notch and a thickness of $\frac{1}{8}$-inch.

Furthermore, the reclaimed resin material of the present invention is made by mixing and dispersing the rubber component into the resin material taken out from the optical recording disk.

The rubber component of 3 weight % or more is added to the resin material.

As described above, in the method of reclaiming the resin material from the optical recording disk according to the present invention, there is employed a mechanical method in which the surface of the disk in which the recording layer is provided is polished by the polishing member to thereby remove the recording layer. Therefore, the disk base plate material can be efficiently recycled by a simple method.

In the prior art, a boiling point of the disk base plate material is relatively low so that, when the surface of the disk is polished by a mechanical polishing method, the base material is melted before the recording layer of the optical recording disk, e.g., the label printing layer or the like is removed.

In particular, by selecting the revolution rate of the polishing member to be less than 3000 r.p.m. and the grade of the polishing member to be #320, the base plate can be reliably protected from being heated at a temperature higher than the melting temperature. Therefore, the base material from the optical recording disk can be recycled efficiently.

Further, the reproduced resin material having the structure of the present invention can provide Izod shock value of, for example, 8 kgfcm/cm or more that is required as, for example, a plastic molded product having a high mechanical strength.

As described above, according to the method of reclaiming the resin material from the optical recording disk, since the unnecessary recording layer or the like such as ones on the disk surface can be removed by the mechanical method such as the polishing process or the like instead of the chemical method, the resin which is the base plate material of the optical recording disk that had been wasted in large amount recently can be taken out efficiently by the apparatus of simple arrangement. Therefore, the resin material can be efficiently recycled.

Furthermore, according to the resin material of the structure of the present invention, the mechanical characteristic utilizing the reclaimed resin, in particular, the Izod shock value can be improved. Thus, the usage of the recycled resin material can be considerably expanded, which can provide very large industrial and social advantages.

BRIEF DESCRIPTION OF DRAWINGS

FIG. 2 is a diagram used to explain operation of an example of a polishing member, FIG. 3 is a schematic cross-sectional view of an example of an optical recording disk.

BEST MODE FOR CARRYING OUT THE INVENTION

A method of reclaiming resin material from an optical recording disk according to an embodiment of the present invention will be described hereinafter.

Figure 1:
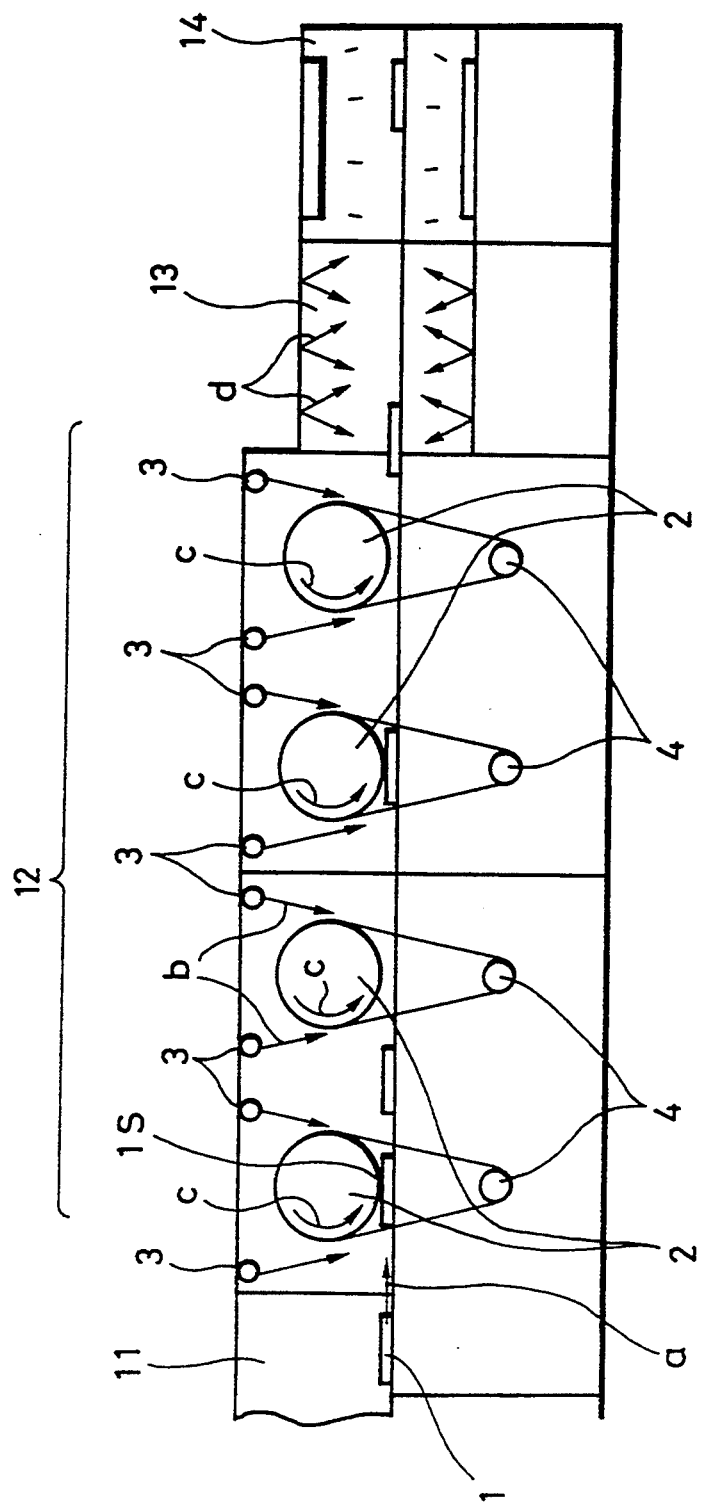
FIG. 1 is a schematic diagram of a structure of an example of an apparatus which carries out a method of reclaiming a resin material from an optical recording disk according to the present invention.

In this case, there is used a reclaiming apparatus that is constructed as shown in FIG. 1.

In this case, the optical recording disk is transported from a starting unit 11 to a polishing unit 12 as shown by an arrow a. In the polishing unit 12, polishing members 2 of cylindrical shapes that had been made by hot-pressing abrasive grains and adhesive agent mixed into a supporting member are sequentially supported in the transport direction of the optical recording disk 1 in parallel to each other so that four polishing members can be rotated respectively.

The respective polishing members 2 are rotated in unison with one another in the counter-clockwise direction in FIG. 1, i.e., in the direction shown by an arrow c by a rotary shaft 4 that is rotated by, for example, a motor.

Feed water tubes 3 are respectively provided before and after the polishing members 2 with respect to the transport direction of the disk 1 so that water is supplied between the polishing member 2 and the optical recording disk 1 from the upper oblique direction as shown by an arrow b. Thus, a surface 1S of the optical recording disk 1 can be suppressed from being heated upon polishing and also the polishing can be carried out smoothly.

After the surface 1S had been polished by the four polishing members 2, the optical recording disk 1 is transported to a water rinsing unit 13, in which it is rinsed by water supplied as shown by an arrow d and then dried by a drying unit 14. Thereafter, the product is crushed by a crusher, not shown and then preserved.

The polishing member 2 may be constructed by a brush which is provided by processing a polishing sheet of a cylindrical shape in which a mixture of abrasive grains such as alumina, silicon carbide or the like and an adhesive agent is hot-pressed on a non-woven textile of, for example, NYLON 66 (trade name and manufactured by E. I. du Pont de Nemours & Company), i.e., so-called buffing brush.

Further, in this polishing apparatus, a transport speed of for example, the disk 1 is selected to be 1 to 2 m/minute, rotational speed of the polishing member 2 is selected to be 1,500 to 3,000 r.p.m., vibration width x of the polishing member 2 is selected to be 5 to 6 mm, the number of polishing members 2 is selected to be 2 to 4 and the grade of the polishing member 2 is selected to be #320 to #100.

Incidentally, if the revolution rate of the polishing member 2 is selected to be less than 1,500 r.p.m., then the polishing process becomes difficult, which requires a long polishing time, causing a productivity thereof to be lowered. If the revolution rate of the polishing member exceeds 3000 r.p.m., then an amount of generated heat is increased. There is then the risk that a disk base plate material will be melted. Further, if the grade of the polishing member is selected to be less than #320, then the surface of the polishing member becomes too coarse, causing the heat generated amount to be increased. If the grade of the polishing member exceeds #1000, then the surface of the polishing member becomes too fine to effect the polishing, thereby lowering the productivity. Therefore, it is desirable that the revolution rate of the polishing member 2 is selected in a range of from 1,500 to 3,000 r.p.m., and that the grade thereof is selected in a range of from #320 to #1000.

Furthermore, the vibration width x of the polishing member 2 depicts the movement amount in which the polishing member 2 is vibrated back and forth in a shaft d direction thereof as shown by an arrow e.

(Embodiment 1)

Figure 4:
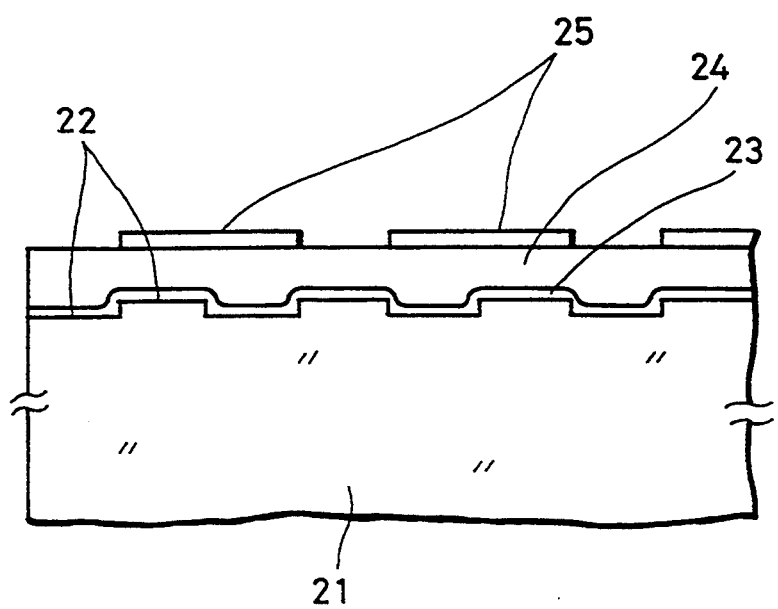
FIG. 4 is a schematic cross-sectional view showing an example of the optical recording disk in a partly enlarged scale.

In this embodiment, the optical recording disk that will be reclaimed and recycled includes a central aperture $1a$ into which a spindle of a disk drive apparatus is rotatably fitted and a signal recording portion 20 formed around the central aperture by concavities and convexities in response to recording information as shown by a schematic cross-sectional view and a fragmentary enlarged cross-sectional view of FIGS. 3 and 4. In the optical recording disk 1 of this case, an outer diameter thereof $\phi_3$ is 120 mm, a diameter $\phi_1$ of the central aperture $1a$ is 15 mm and an inner diameter $\phi_2$ of the signal recording portion 20 is 46 mm.

Further, in this optical recording disk 1, concavities and convexities 22 are formed on one major surface of a base plate 21 made of PC (manufactured by Teijin Kasei Kabushiki Kaisha under the trade name of AD503) on which an Al evaporated film 23 having a thickness of 1 $\mu$m, a protecting film 24 having a thickness of 5 to 10 $\mu$m and a label printing film 25 having a thickness of 20 $\mu$m are deposited.

This optical recording disk 1 was polished by the polishing apparatus of FIG. 1.

Figure 5:
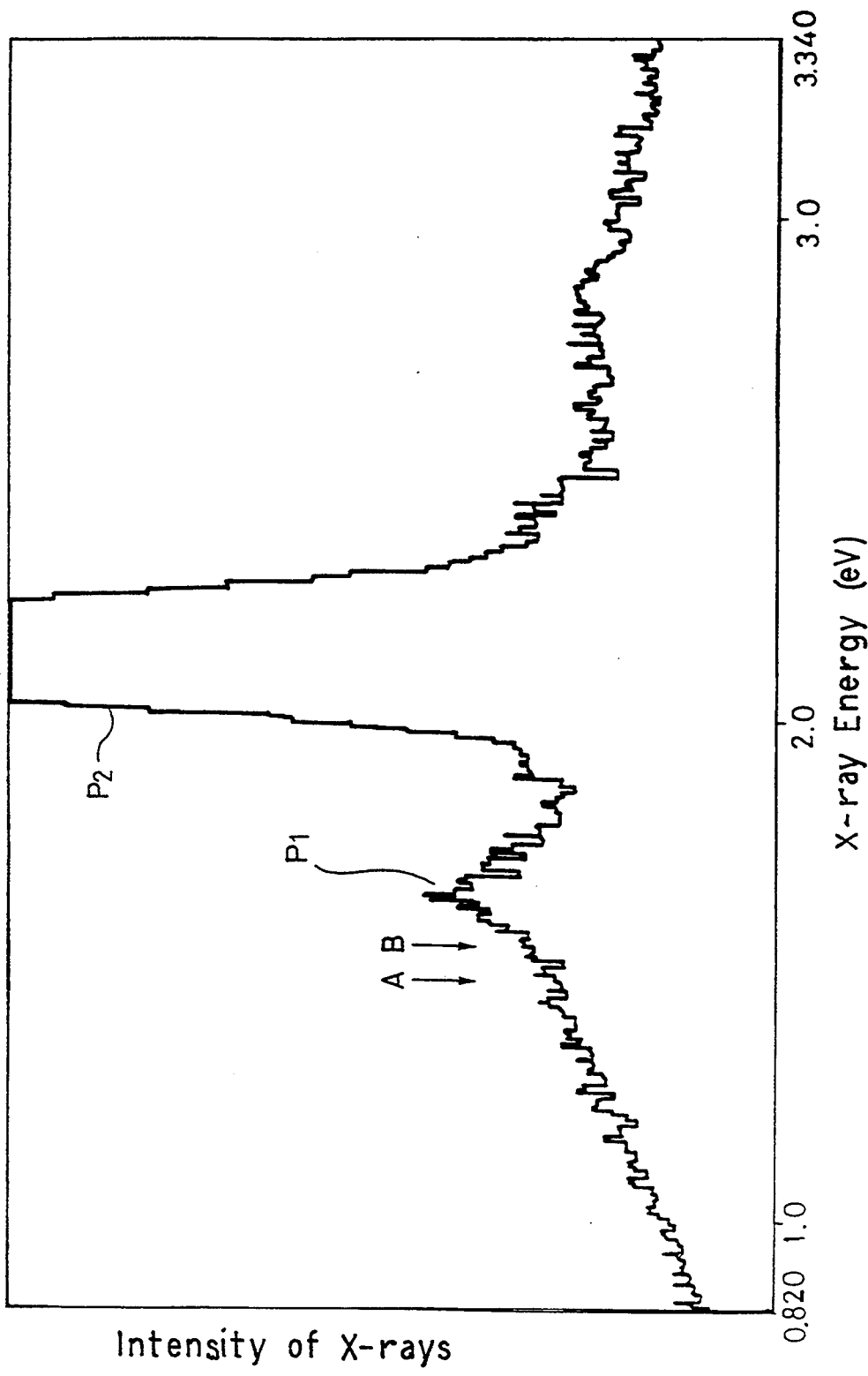
FIG. 5 is a diagram showing analyzed results of the disk base plate surface that had been polished according to the method of reclaiming the resin material from the optical recording disk according to the present invention.

In order to confirm impurities on the polished surface 1S of the disk 1 after polishing process, the existence of aluminum film on the polished surface was analyzed by an EDX (energy-dispersive-X-ray focusing method). The results are illustrated in FIG. 5. In FIG. 5, $P_1$, $P_2$ indicate peaks of Au, respectively, which are produced when Au was coated on the whole surface upon measurement. Although peaks are produced when Al exists at the positions shown by arrows A and B in FIG. 5, according to the aforesaid embodiment, study of FIG. 5 reveals that no peaks are discovered. It is therefore confirmed that Al is not left on the surface and that the label printing film 25, the protecting film 24, the Al evaporated film 23 or the like are all removed.

The disk thus polished is rinsed by water, dried, crushed, mulled by an extruder and thereby repelleted.

A test sample 1 was manufactured by using the repellet obtained in the embodiment 1 according to the injection molding.

A table 1 shows mechanical characteristics of the test sample 1 made of the reclaimed resin material of the embodiment 1, a test sample 2 of a conventional product made of a resin material that is provided by only crushing the optical recording disk on which the Al evaporated film 23, the protecting film 24 is still left apart from the polishing process of the present invention, and a test sample 3 not reclaimed but made of a perfectly new, i.e., so-called virgin PC (manufactured by Teijin Kasei Kabushiki kaisha under the trade name of AD5503).

TABLE 1

| CHARAC-TERISTICS | UNIT | TEST METHOD | TEST SAMPLE 1 | TEST SAMPLE 2 | TEST SAMPLE 3 |
| --- | --- | --- | --- | --- | --- |
| tensile strength (yield) | kgf/cm$^2$ | ASTM D638 | 610 | 600 | 650 |
| tensile strength (break) | kgf/cm$^2$ | ASTM D638 | 470 | 400 | 530 |
| tensile elongation (break) | % | ASTM D638 | 52 | 25 | 110 |
| flexural strength | kgf/cm$^2$ | ASTM D790 | 1000 | 900 | 960 |
| flexural rigidity | kgf/cm$^2$ | ASTM D790 | 23000 | 20000 | 24000 |
| Izod shock value | kgfcm/cm | ASTM D785 ($\frac{1}{8}$-inch with notch) | 5.9 | 3.5 | 8 |

Study of table 1 reveals that the test sample 1 (embodiment 1) of the present invention exhibits excellent characteristics on the whole field of mechanical characteristics as compared with the conventional test sample and that the Izod shock value was improved considerably.

However, according to the present invention, in order to further improve the mechanical characteristics, particularly, Izod shock value, by utilizing the reclaimed resin obtained by the aforesaid method of the present invention, the Izod shock value of the present invention is made close to that of the virgin resin (test sample 3). Besides, as a resin that can exhibit higher Izod shock value, there can be obtained a molded product having a shock-resistance enough so that it can be used as a casing such as various kinds of cases, cabinets or the like.

In the test sample 1 of the present invention, to the resin material reclaimed from the optical recording disk are added reactive modifiers such as reactive random, graft and block copolymers having polymer skeletons which have acid group, glycidyl group and anhydride group for reacting with this resin and which can improve a shock-resistance.

One embodiment of this embodiment will be enumerated as embodiment 2.

(Embodiment 2)

The reclaimed resin, obtained in the embodiment 1, was crushed, added and mulled with ethylene vinyl acetate/ethylene propylene 1.4 and diene copolymer (manufactured by HIGH TECH PLASTIC CO., LTD., under the trade name of Benette GR-10), thereby obtaining a pellet. Then, samples 4, 5 were manufactured by using the aforesaid pellet according to the injection molding process. In this case, in the samples 4 and 5, adding amounts of the modifier were selected to be 5 weight %, 3 weight % and a ratio of reclaimed resin P/modifier S (weight) was selected to be 95/5, 97/3, respectively.

Mechanical characteristics of these samples 4, 5 are illustrated in table 2.

housings can sufficiently endure the shock from the outside and accommodated products can be thereby protected reliably.

Further, according to the present invention, to the reclaimed resin from the optical recording disk are added compatible resin therewith, i.e., thermoplastic resin such as ABS (acrylonitrile-styrene-butadiene copolymer), ASA (acrylonitrile-styrene-acrylate ester copolymer), SMA (styrene-maleic anhydride copolymer), PE (polyethylene), PP (polypropylene), PEI (polyetherimide), acrylic resin, TPU (thermoplastic polyurethane), PA (polyamide), PET (polyethylene terephthalate), PBT (polybutylene terephthalate), PC or the like.

Embodiments of this case will be enumerated as embodiments 3 and 4. In the embodiment 3, ABS was added to the reclaimed resin while PC was added to the reclaimed resin in the embodiment 4.

(Embodiment 3)

The reclaimed resin reclaimed from the optical recording disk of the embodiment 1 was crushed, and added and mulled with TOYOLACK 300 (trade name and manufactured by TORAY INDUSTRIES INC.) of ABS having Izod shock value of 20 kg.f.cm/cm or

TABLE 2

| CHARACTERISTICS | UNIT | TEST METHOD | TEST SAMPLE 4(P/S = 95/5) | TEST SAMPLE 5(P/S = 97/3) |
|---|---|---|---|---|
| tensile strength (yield) | kgf/cm² | ASTM D638 | 540 | 563 |
| tensile strength (break) | kgf/cm² | ASTM D638 | 440 | 447 |
| tensile elongation (break) | % | ASTM D638 | 40 | 38 |
| flexural strength | kgf/cm² | ASTM D790 | 950 | 980 |
| flexural rigidity | kgf/cm² | ASTM D790 | 21000 | 20600 |
| Izod shock value | kgfcm/cm | ASTM D785 (⅛-inch with notch) | 25.5 | 19.2 |

According to the test samples 4, 5 of the embodiment 2, it is to be appreciated that, particularly, the shock-resistance values thereof are further improved by the addition of the modifier of 3 weight % as compared with the virgin product (test sample 3) on the table 1. Therefore, even when the case of, for example, the optical recording disk, compact disk or the like and a variety of housings such as cabinet or the like are molded by the resin material thus obtained, then these more, thereby producing a pellet. Then, test samples 6, 7 and 8 were produced by using the resultant pellet according to the injection molding process.

In the test samples 6, 7 and 8, the ratio P/Po (weight ratio) of the reclaimed resin P and the compatible resin Po was respectively selected to be P/Po=90/10, 80/10, and 60/40. Measured results of mechanical characteristics thereof are illustrated in table 3.

TABLE 3

| CHARACTERISTICS | UNIT | TEST METHOD | TEST SAMPLE 6(P/Po = 90/10) | TEST SAMPLE 7(= 80/20) | TEST SAMPLE 8(= 60/40) |
|---|---|---|---|---|---|
| tensile strength (yield) | kgf/cm² | ASTM D638 | 620 | 600 | 540 |
| tensile strength (break) | kgf/cm² | ASTM D638 | 510 | 480 | 450 |
| tensile elongation (break) | % | ASTM D638 | 77 | 70 | 65 |
| flexural strength | kgf/cm² | ASTM D790 | 1000 | 920 | 810 |
| flexural | kgf/cm² | ASTM D790 | 23400 | 24000 | 24600 |

TABLE 3-continued

| CHARAC-TERISTICS | UNIT | TEST METHOD | TEST SAMPLE 6(P/Po = 90/10) | TEST SAMPLE 7(= 80/ 20) | TEST SAMPLE 8(= 60/ 40) |
|---|---|---|---|---|---|
| rigidity Izod shock value | kgfcm/cm | ASTM D785 (⅛-inch with notch) | 7.8 | 13.3 | 21 |

(Embodiment 4)

The reclaimed resin reclaimed from the optical recording disk of the embodiment 1 was crushed, added and mulled with PC (manufactured by TORAY INDUSTRIES INC. under the trade name of K-1300) having Izod shock value of 95 kg.f.cm/cm or more, thereby producing a pellet. Then, test samples 9, 10 and 11 were produced by using the resultant pellet according to the injection molding process. In the test samples 9, 10 and 11, the ratio P/Po (weight) of the reclaimed resin P and Po was respectively selected to be P/Po=90/10, P/Po=80/20, and P/Po=60/40. Measured results of mechanical characteristics of the test samples 9 to 11 are illustrated in table 4.

TABLE 4

| CHARAC-TERISTICS | UNIT | TEST METHOD | TEST SAMPLE 9(P/Po = 90/10) | TEST SAMPLE 10(= 80/ 20) | TEST SAMPLE 11(= 60/ 40) |
|---|---|---|---|---|---|
| tensile strength (yield) | kgf/cm$^2$ | ASTM D638 | 620 | 610 | 610 |
| tensile strength (break) | kgf/cm$^2$ | ASTM D638 | 510 | 480 | 480 |
| tensile elongation (break) | % | ASTM D638 | 77 | 82 | 85 |
| flexural strength | kgf/cm$^2$ | ASTM D790 | 1000 | 1000 | 110 |
| flexural rigidity | kgf/cm$^2$ | ASTM D790 | 23400 | 23000 | 22600 |
| Izod shock value | kgfcm/cm | ASTM D785 (⅛-inch with notch) | 6.3 | 18.3 | 38 |

Also in this case, as compared with the test sample 2 of the reclaimed resin itself, Izod shock values were improved. Particularly, when the adding amount of PC was 20 weight % or more, Izod shock values were improved remarkably. Therefore, the reclaimed resin material can be used as the molded product for the housings or the like.

Furthermore, according to the present invention, the strength of the reclaimed resin can be increased by using a rubber-based dispersing agent.

An embodiment of this case will be enumerated as embodiment 5.

(Embodiment 5)

An acrylic rubber EEA (ethylene ethyl acrylate) was mixed and dispersed into the reclaimed resin taken out from the optical recording disk of the embodiment 1, thereby producing a pellet. Then, test samples 12, 13 and 14 were obtained by processing that pellet according to the injection molding process.

In these test samples 12, 13 and 14, a ratio of the reclaimed resin P taken out from the optical recording disk and the acrylic rubber G, i.e., P/G (weight ratio) is selected to be P/G=98/2, P/G=97/3 and P/G=96/4 and P/G=95/5, respectively. Measured results of the mechanical characteristics thereof are illustrated in table 5.

TABLE 5

| CHARAC-TERISTICS | UNIT | TEST METHOD | TEST SAMPLE 12(P/G = 98/2) | TEST SAMPLE 13(= 97/ 3) | TEST SAMPLE 14(= 96/ 4) | TEST SAMPLE 15(= 95/ 5) |
|---|---|---|---|---|---|---|
| tensile strength (yield) | kgf/cm$^2$ | ASTM D638 | 600 | 590 | 580 | 560 |
| tensile strength (break) | kgf/cm$^2$ | ASTM D638 | 490 | 460 | 490 | 450 |
| tensile elongation (break) | % | ASTM D638 | 84 | 73 | 75 | 62 |
| flexural strength | kgf/cm$^2$ | ASTM D790 | 890 | 900 | 880 | 850 |

TABLE 5-continued

| CHARACTERISTICS | UNIT | TEST METHOD | TEST SAMPLE 12(P/G = 98/2) | TEST SAMPLE 13(= 97/ 3) | TEST SAMPLE 14(= 96/ 4) | TEST SAMPLE 15(= 95/ 5) |
|---|---|---|---|---|---|---|
| flexural rigidity | kgf/cm$^2$ | ASTM D790 | 23000 | 22000 | 22000 | 22000 |
| Izod shock value | kgfcm/cm | ASTM D256 (⅛-inch with notch) | 6.9 | 9.0 | 42.4 | 47.0 |

As will be clear from the measured results, the Izod shock values can be remarkably increased by the mixing and dispersion of the rubber component of a small amount.

Each of the test samples according to the respective embodiments has a transparent appearance having no impurity.

While PC is used as the base plate material of the optical recording disk 1 as described above, it is needless to say that the present invention may be applied to disks made of a variety of resin materials.

Furthermore, the method of the present invention is not limited to the polishing method using the above-mentioned polishing apparatus. By using other various polishing apparatus and the polishing member made of various material in addition to the buffing brush, the resin material can be taken out, i.e., reclaimed from the optical recording disk.

We claim:

1. A method of reclaiming resin material from an optical recording disk comprising:
providing an optical recording disk whose resin material is to be reclaimed, said optical recording disk including a base resin layer having a multi-layer recording medium defined on an upper major surface thereof; and
removing the multi-layer recording medium from the upper major surface of the base resin layer by passing the optical recording disk through a polishing station in a single direction at a rate of from about 1 to about 2 meters per minute and contacting the upper surface in the polishing station with at least one rotating cylindrical polishing member while spraying the upper surface and polishing member with water, said cylindrical polishing member including a polishing surface defined by abrasive grains having an abrasive grain size of between about #320 to about #1000 and an adhesive agent hot pressed onto the surface of the polishing member, said cylindrical polishing member being rotated at a rotational speed of from about 1,500 to about 3,000 r.p.m., said optical recording disk being polished in said polishing station under conditions selected to remove substantially all of the multi-layer recording medium from said upper surface without melting the base resin layer.

2. A method as defined in claim 1, wherein said rotating cylindrical polishing member is rotated in a counter-clockwise direction with respect to the passing direction of the disk through the polishing station.

3. A method as defined in claim 1, wherein in said removing step, the upper surface is successively contacted by a plurality of spaced rotating cylindrical polishing members as the disk passes through the polishing station.

4. A method as defined in claim 1, wherein each of said rotating cylindrical polishing members are rotated in a counter-clockwise direction with respect to the passing direction of the disk through the polishing station.

5. A method as defined in claim 1, wherein in said removing step, the upper surface and polishing member are sprayed with water from an upper oblique direction both before and after the cylindrical polishing member contacts the upper surface of the disk as the disk is passing through the polishing station.

* * * * *